(12) United States Patent
Sulosky

(10) Patent No.: US 12,419,450 B2
(45) Date of Patent: Sep. 23, 2025

(54) SEASONING DISPENSING APPARATUS

(71) Applicant: Steven Sulosky, Latrobe, PA (US)

(72) Inventor: Steven Sulosky, Latrobe, PA (US)

( * ) Notice: Subject to any disclaimer, the term of this patent is extended or adjusted under 35 U.S.C. 154(b) by 264 days.

(21) Appl. No.: 18/219,072

(22) Filed: Jul. 6, 2023

(65) Prior Publication Data

US 2025/0009153 A1    Jan. 9, 2025

(51) Int. Cl.
*A47G 19/34* (2006.01)
*A47J 47/01* (2006.01)

(52) U.S. Cl.
CPC .............. *A47G 19/34* (2013.01); *A47J 47/01* (2013.01)

(58) Field of Classification Search
CPC .......... A47J 31/404; A47J 47/01; A47G 19/34
USPC ....................................................... 222/129
See application file for complete search history.

(56) References Cited

U.S. PATENT DOCUMENTS

| | | | |
|---|---|---|---|
| 7,275,647 B1 | 10/2007 | Thompson | |
| 8,932,661 B2 | 1/2015 | Shimono | |
| 9,332,880 B2 | 5/2016 | Delbridge | |
| 2012/0217214 A1 | 8/2012 | Thomsen | |
| 2017/0280763 A1 * | 10/2017 | Nazarian | A23P 20/15 |
| 2019/0313844 A1 * | 10/2019 | Nadendla | A47J 37/108 |
| 2023/0098024 A1 * | 3/2023 | Ghafari | A47J 36/32 |
| | | | 99/326 |
| 2023/0190045 A1 * | 6/2023 | Singh | B25J 11/0045 |
| | | | 426/231 |
| 2024/0000252 A1 * | 1/2024 | Tanaka | A47G 19/34 |

FOREIGN PATENT DOCUMENTS

| | | | |
|---|---|---|---|
| WO | WO9417693 | 8/1994 | |
| WO | WO-2017031112 A1 * | 2/2017 | A47J 42/26 |

* cited by examiner

*Primary Examiner* — Jeremy Carroll

(57) ABSTRACT

A seasoning dispensing apparatus for dispensing seasonings to form seasoning mixtures includes a housing with a plurality of containers for housing various types of seasonings. Dispensers are mounted to the containers to dispense portions of the seasonings into a receptacle which is movably mounted below the containers. A drive system and guide assembly direct the receptacle to move under selected containers to receive portions of various seasonings. The receptacle deposits the selected seasonings through a dispensing aperture of the housing.

19 Claims, 11 Drawing Sheets

1

SEASONING DISPENSING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dispensing apparatus and more particularly pertains to a new dispensing apparatus for dispensing seasonings to form seasoning mixtures.

(2) Description of Related Art Including Information Disclosed Under 37 CFR 1.97 and 1.98

The prior art discloses various spice racks and other seasoning organization apparatuses. But the prior art fails to describe a seasoning dispensing apparatus which operates to collect selected amounts of various seasonings and dispense them to form a mixture of seasonings. Such an apparatus would be useful for forming seasoning mixtures immediately before use, which facilitates the efficient formation of various seasoning mixtures without requiring storage of larger quantities of such mixtures.

BRIEF SUMMARY OF THE INVENTION

An embodiment of the disclosure meets the needs presented above by generally comprising a housing and a plurality of containers which is coupled to a top wall of the housing. Each container of the plurality of containers defines a compartment therein such that the container is configured for containing an associated one of a plurality of seasonings. Each one of a plurality of dispensers is coupled to a bottom end of an associated one of the plurality of containers and is operable to dispense the associated seasoning from the associated container.

A receptacle is movably mounted in the housing such that the receptacle is interchangeably positionable below each one of the plurality of containers. The receptacle defines a chamber therein such that the receptacle is configured for containing a portion of a selected one of the plurality of seasonings. A panel is mounted to the receptacle and is movable between a deployed position and a release position. The receptacle prevents the portion of the selected seasoning from exiting the chamber when the panel is positioned in the deployed position and permits the portion of the selected seasoning to exit the chamber when the panel is positioned in the release position. A receptacle actuator is coupled to the panel and the receptacle and is operable to move the panel between the deployed position and the release position.

A guide assembly is mounted in the housing which permits the receptacle to move horizontally below the plurality of containers. A drive system is coupled to the guide assembly and is operable to move the receptacle with respect to the plurality of containers. The housing defines a dispensing aperture which extends into the housing, and the receptacle is positionable to selectively dispense the portion of the selected seasoning through the dispensing aperture and out of the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
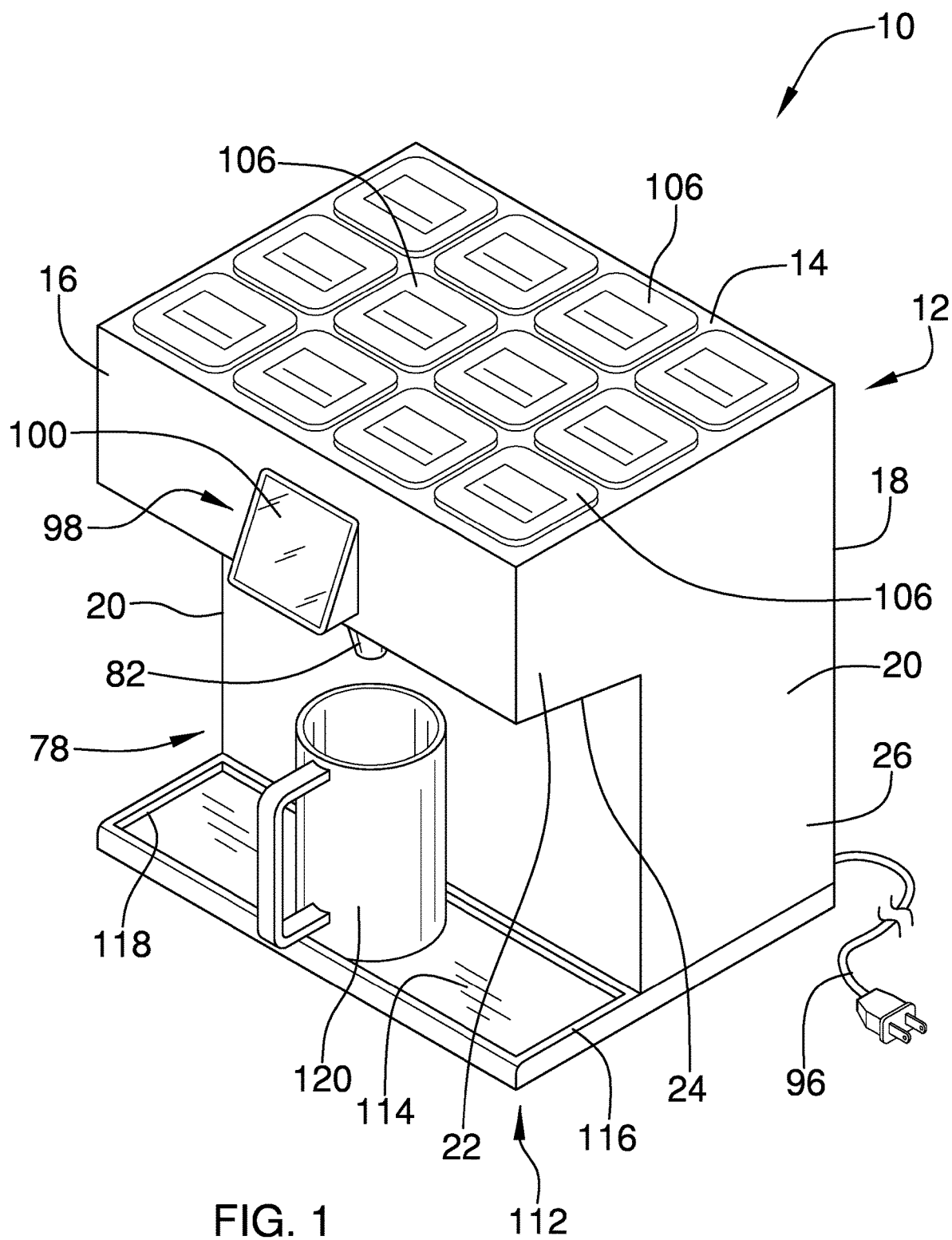
FIG. 1 is a perspective in-use view of a seasoning dispensing apparatus according to an embodiment of the disclosure.
Figure 2:
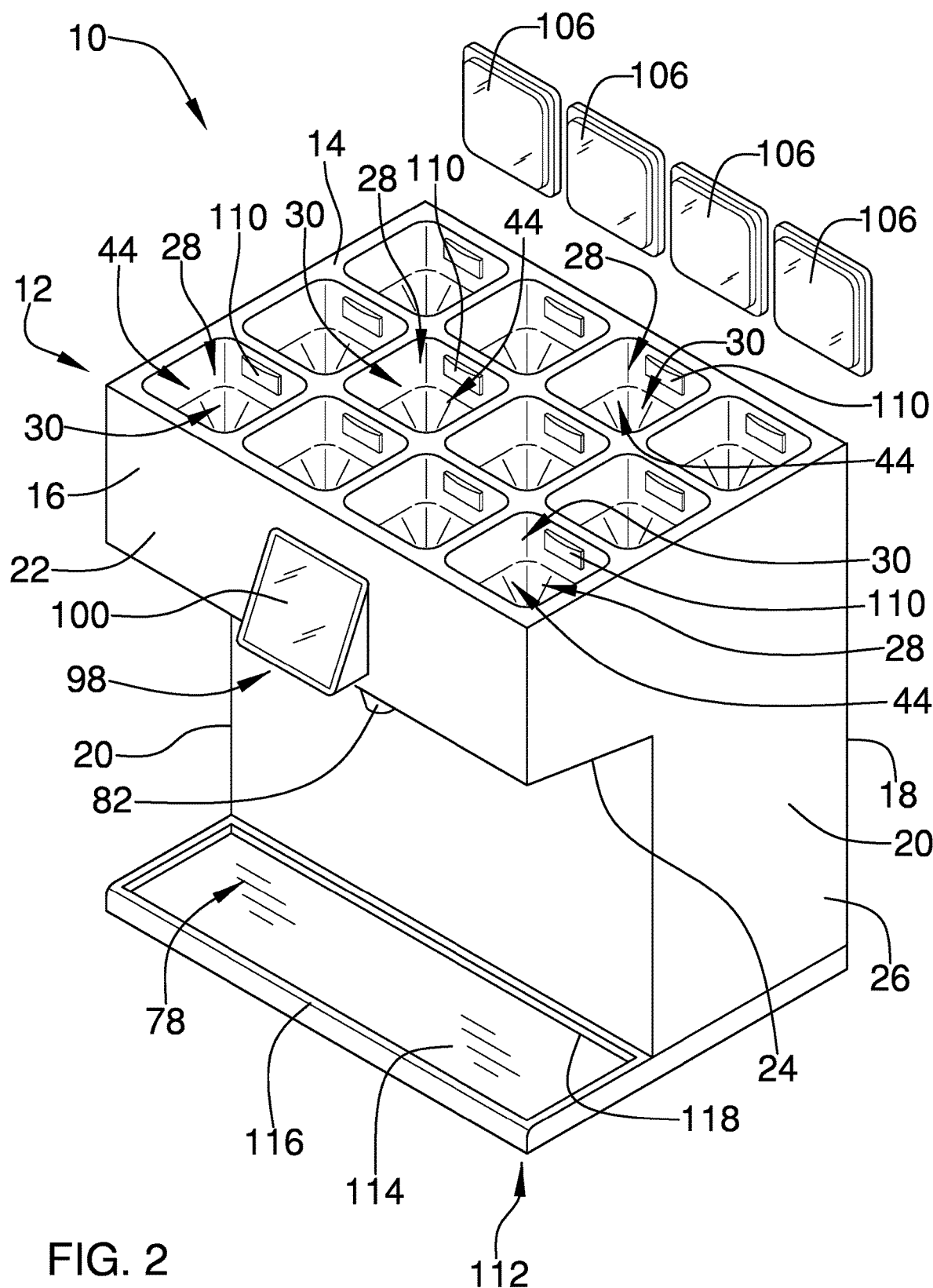
FIG. 2 is a perspective exploded view of an embodiment of the disclosure.
Figure 3:
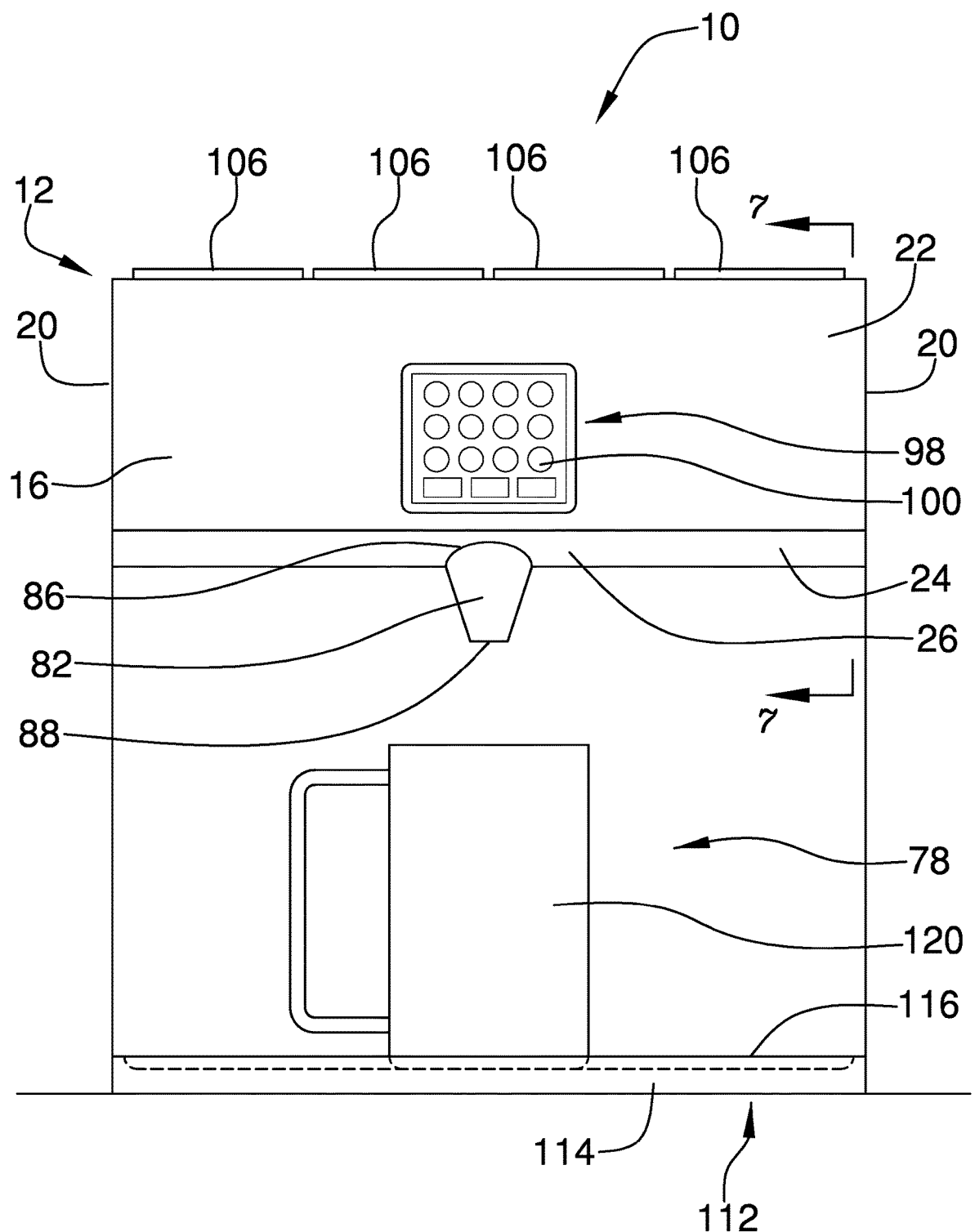
FIG. 3 is a front view of an embodiment of the disclosure.
Figure 4:
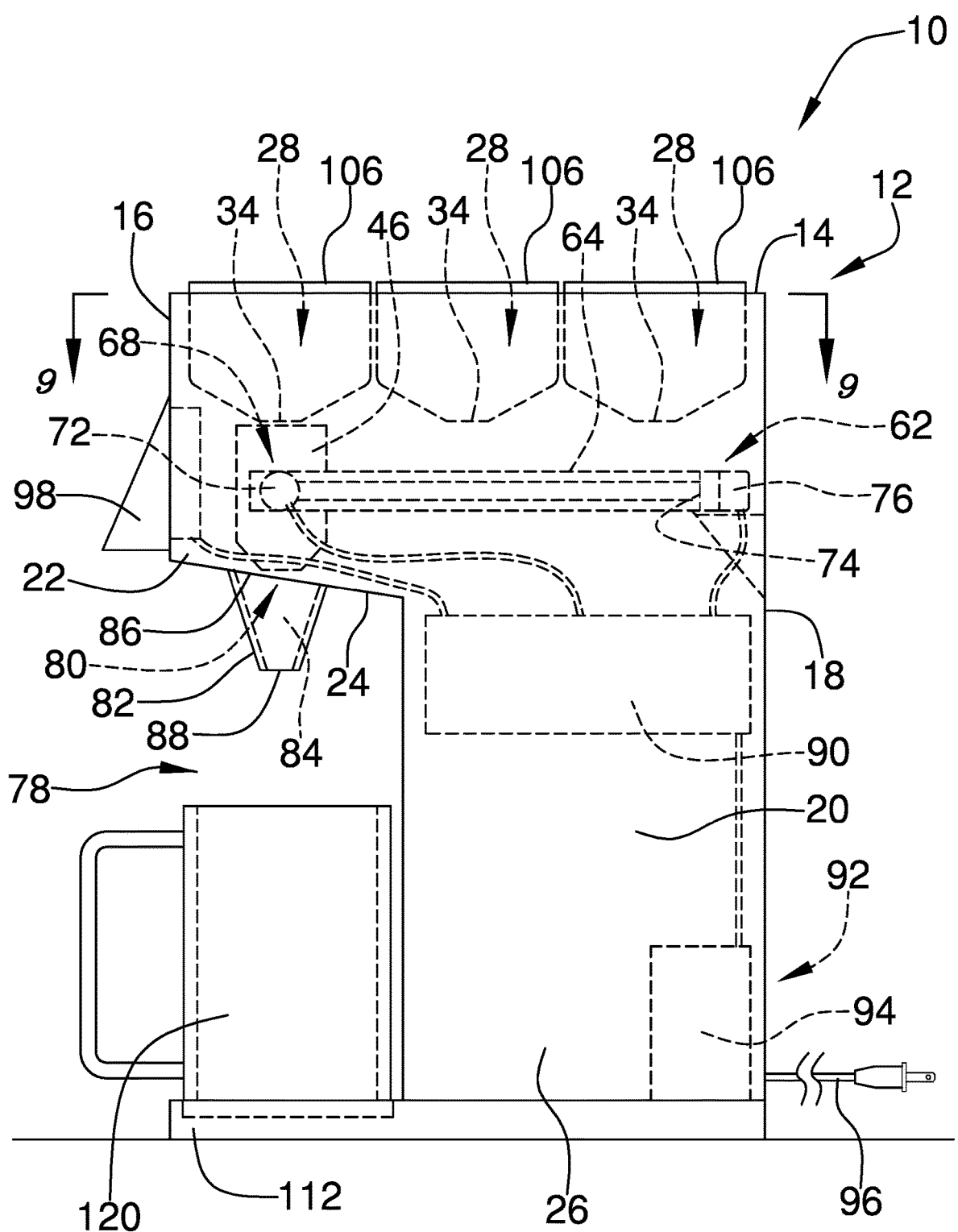
FIG. 4 is a side view of an embodiment of the disclosure.
Figure 5:
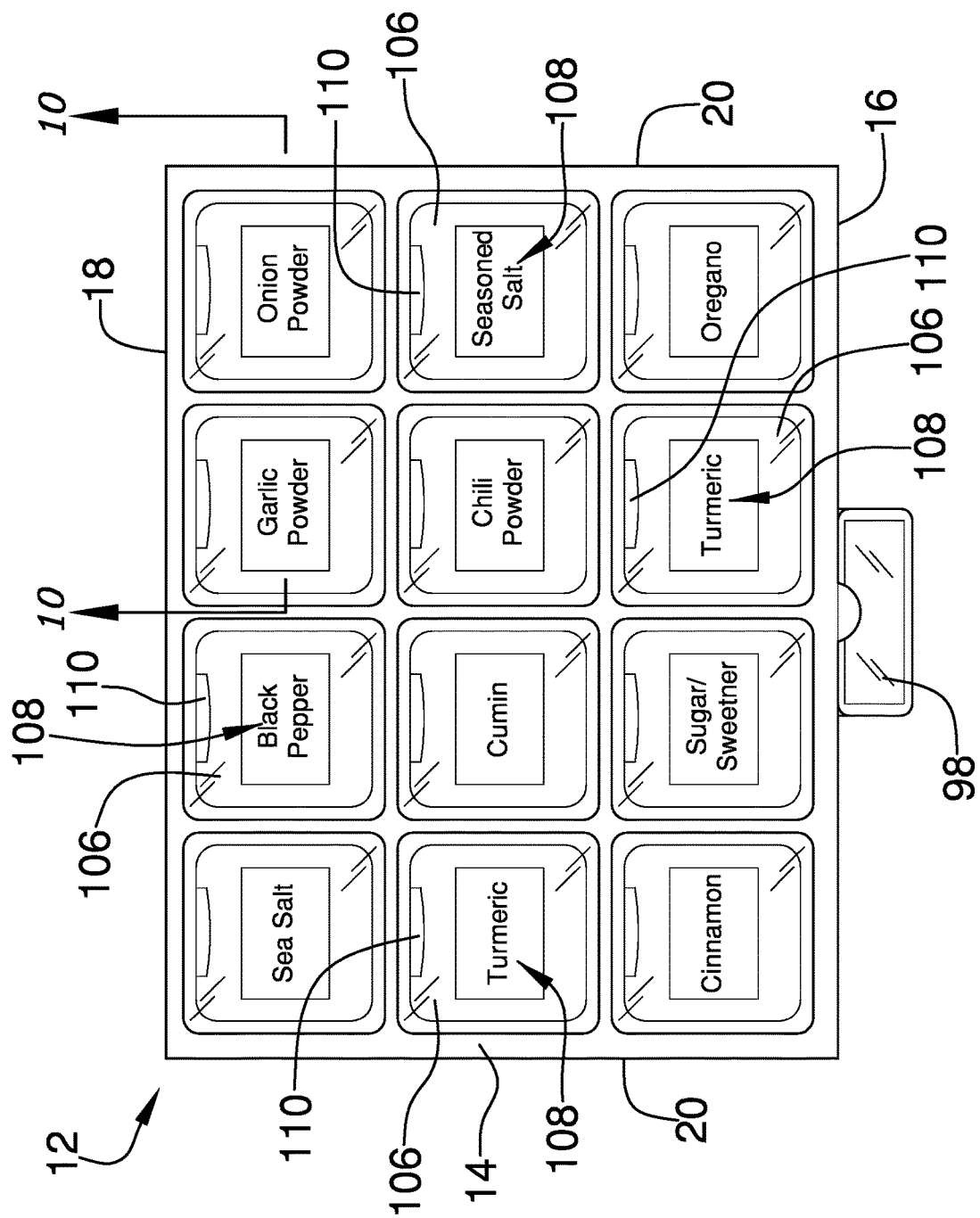
FIG. 5 is a top view of an embodiment of the disclosure.
Figure 6:
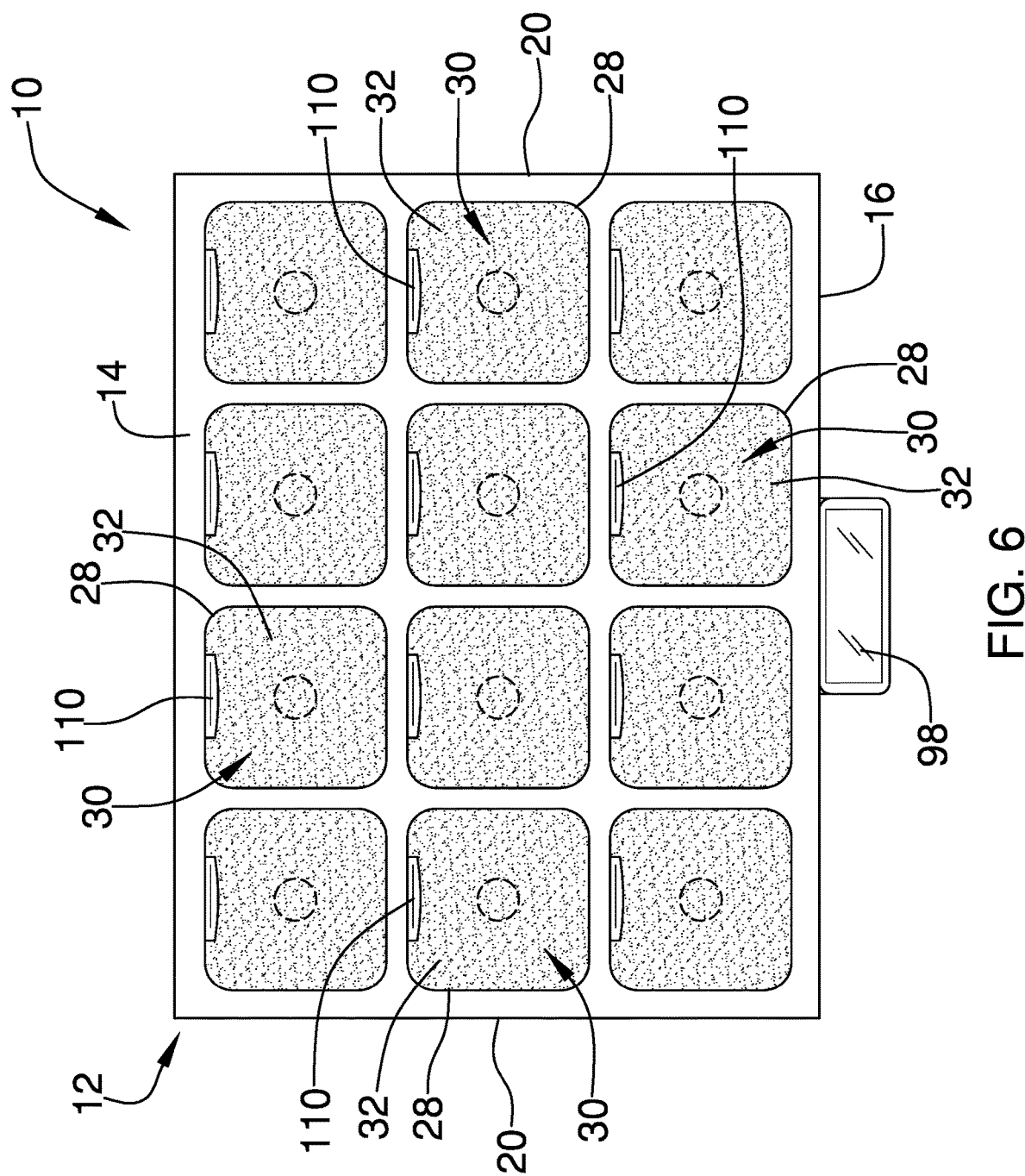
FIG. 6 is a top view of an embodiment of the disclosure with a plurality of lids removed.
Figure 7:
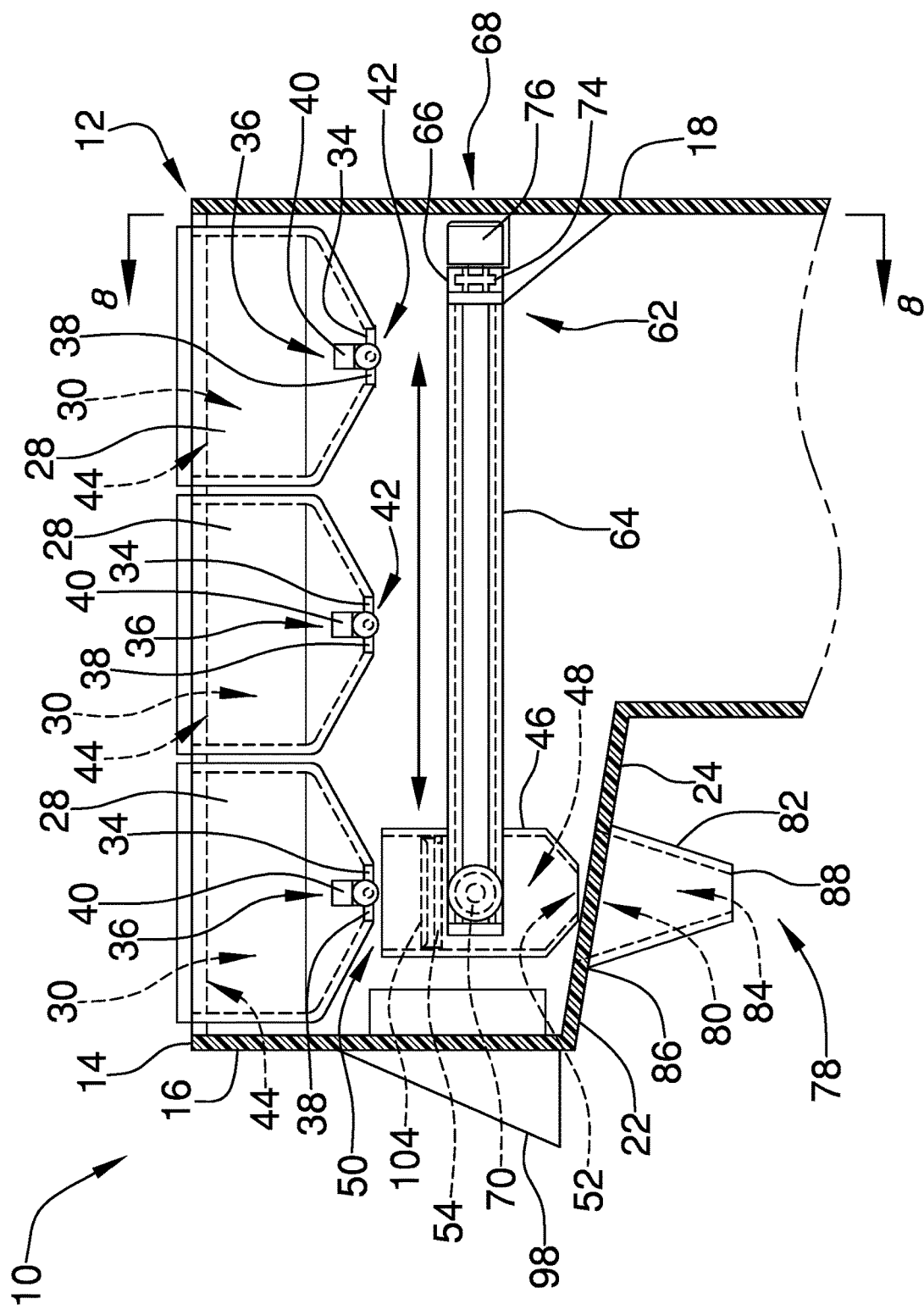
FIG. 7 is a cross-section view of an embodiment of the disclosure taken from Arrows 7-7 in FIG. 3.
Figure 8:
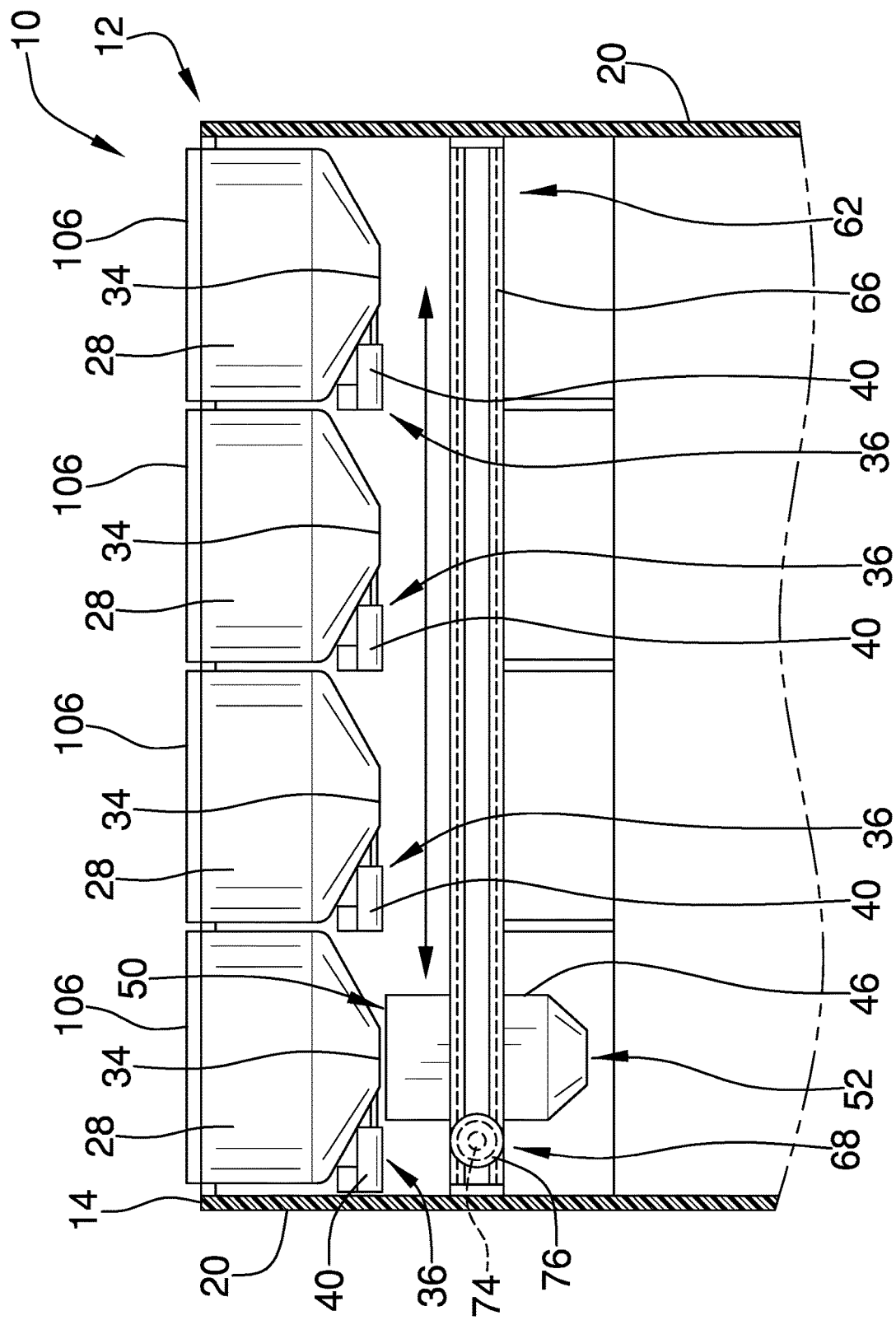
FIG. 8 is a cross-section view of an embodiment of the disclosure taken from Arrows 8-8 in FIG. 7.
Figure 9:
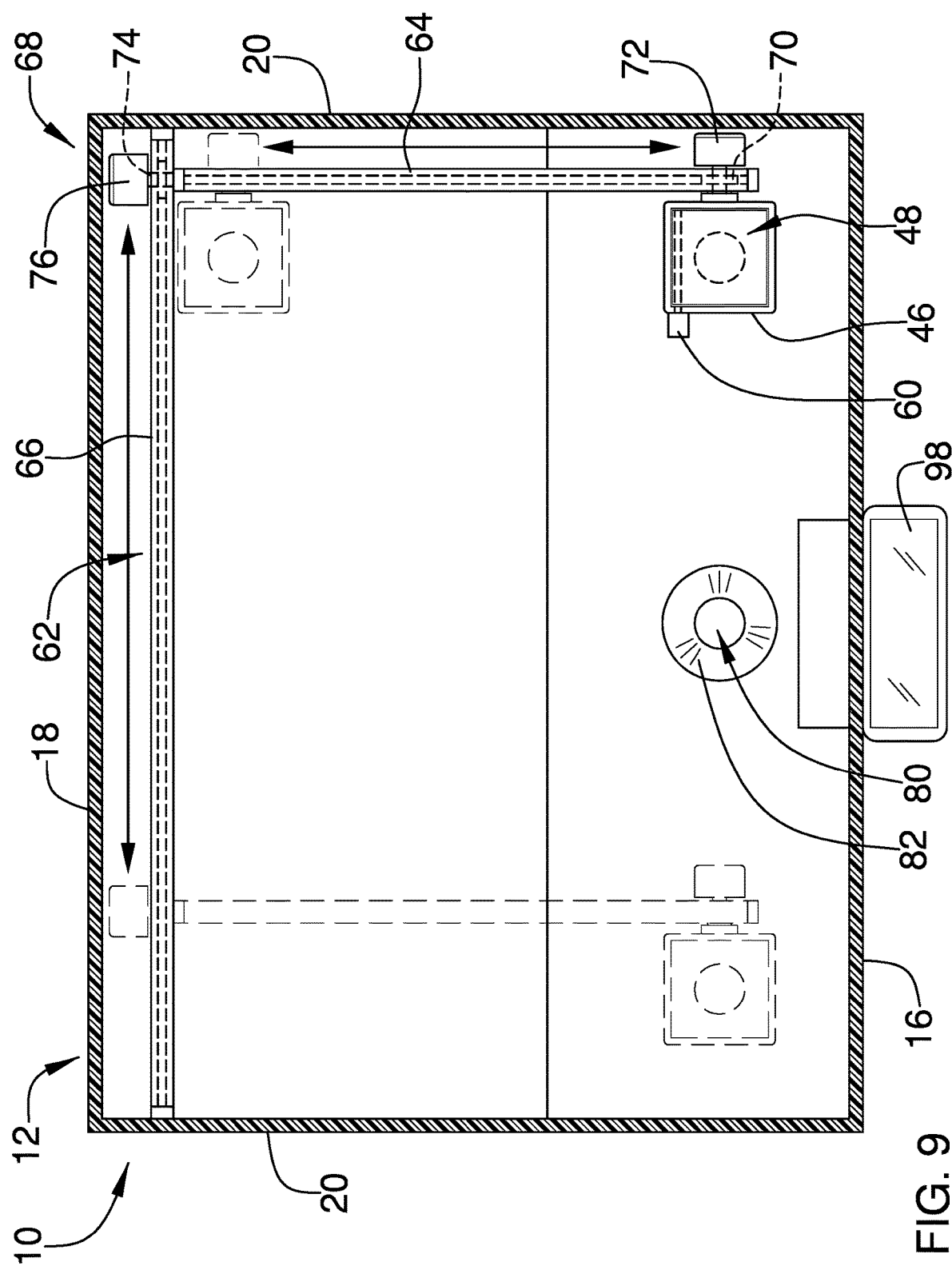
FIG. 9 is a cross-section view of an embodiment of the disclosure taken from Arrows 9-9 in FIG. 4.
Figure 10:
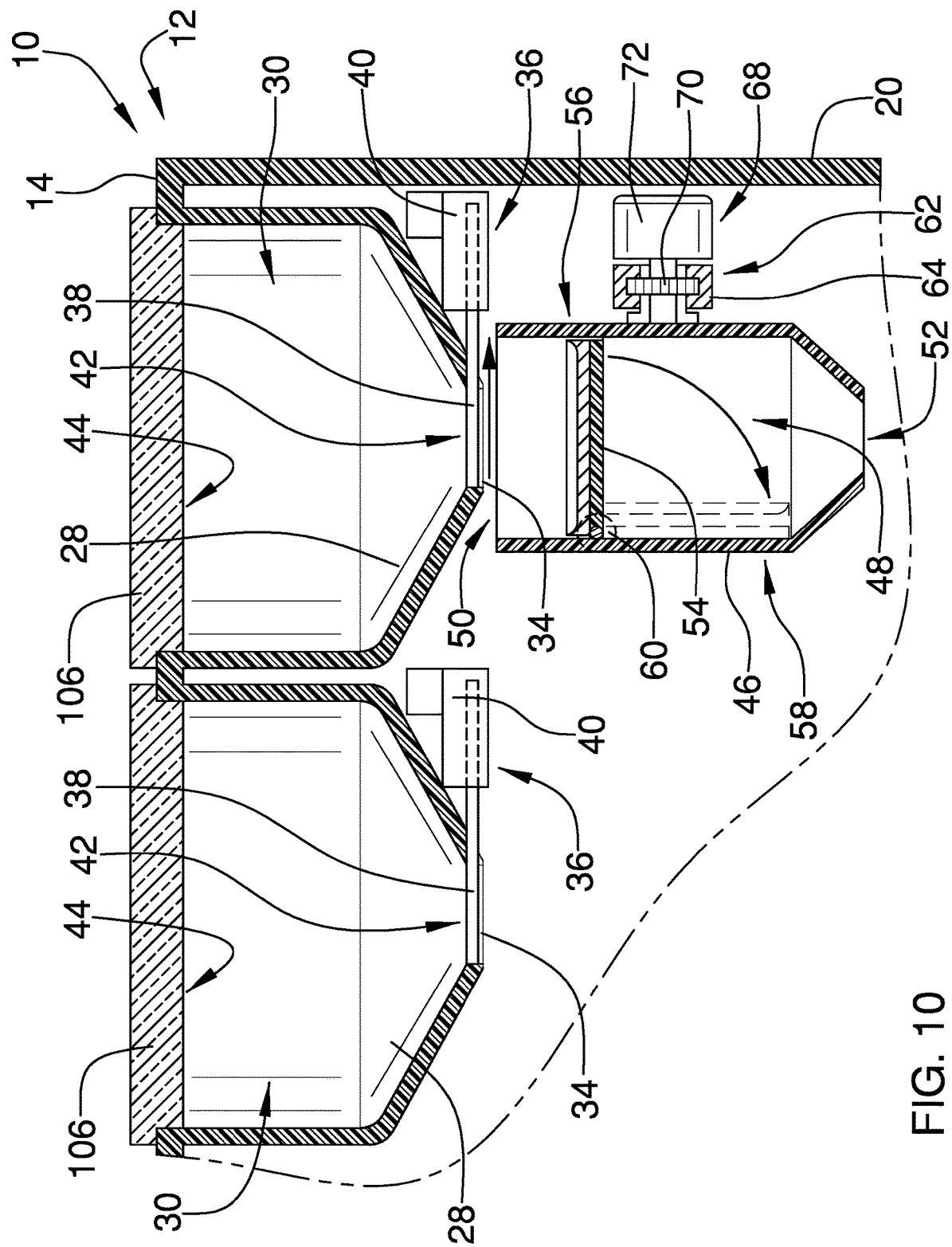
FIG. 10 is a cross-section view of an embodiment of the disclosure taken from Arrows 10-10 in FIG. 5.
Figure 11:
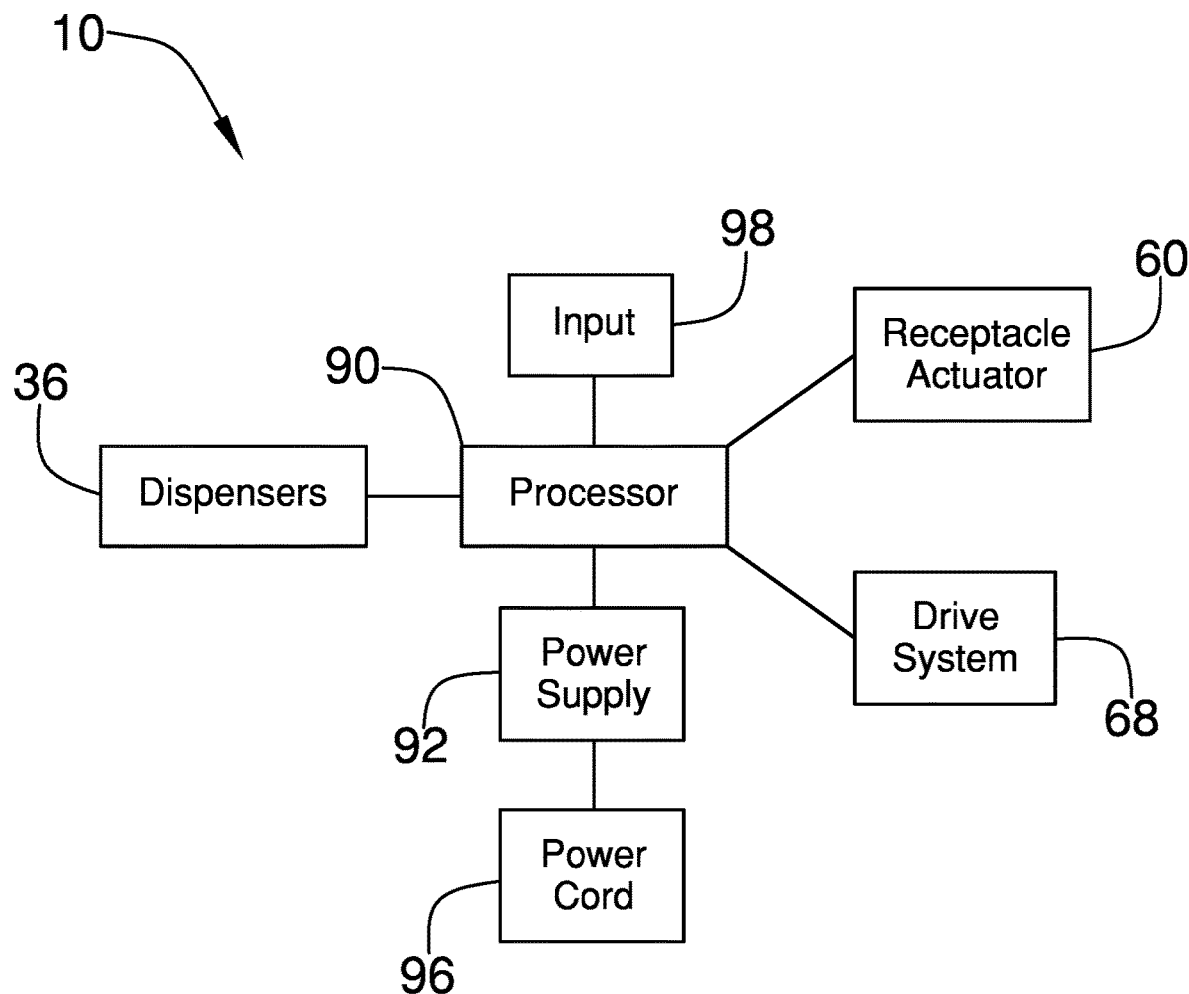
FIG. 11 is a block diagram of an embodiment of the disclosure.

With reference now to the drawings, and in particular to FIGS. 1 through 11 thereof, a new dispensing apparatus embodying the principles and concepts of an embodiment of the disclosure and generally designated by the reference numeral 10 will be described.

As best illustrated in FIGS. 1 through 11, the seasoning dispensing apparatus 10 generally comprises a housing 12 and a plurality of containers 28 which is coupled to a top wall 14 of the housing 12. Each container 28 of the plurality of containers 28 defines a compartment 30 therein such that the container 28 is configured for containing an associated one of a plurality of seasonings 32. The plurality of seasonings 32 may include anything which may impart flavor to food or beverages such as herbs, spices, salt, sugar, and the like. Each one of a plurality of dispensers 36 is coupled to a bottom end 34 of an associated one of the plurality of containers 28 and is operable to dispense the associated seasoning 32 from the associated container 28. Each dispenser 36 of the plurality of dispensers 36 comprises a gate 38 and a dispenser actuator 40. The gate 38 is movable by the dispenser actuator 40 to open and close an outlet 42 defined by the associated container 28. The dispenser actuator 40 is a linear actuator but may be a rotary actuator or the like. Each dispenser 36 of the plurality of dispensers 36 also may comprise other dispensing means such as an auger.

A receptacle 46 is movably mounted in the housing 12 such that the receptacle 46 is interchangeably positionable below each one of the plurality of containers 28. The receptacle 46 defines a chamber 48 therein such that the receptacle 46 is configured for containing a portion of a selected one of the plurality of seasonings 32. The chamber 48 has an upper opening 50 and a lower opening 52 extending therethrough to the chamber 48. A panel 54 is movably mounted in the receptacle 46 between a deployed position 56 and a release position 58. The panel 54 extends across the chamber 48 of the receptacle 46 and prevents the portion of the selected seasoning 32 from exiting the chamber 48 through the lower opening 52 when the panel 54 is positioned in the deployed position 56. The panel 54 permits the portion of the selected seasoning 32 to exit the chamber 48 through the lower opening 52 when the panel 54 is positioned in the release position 58. A receptacle actuator 46 is coupled to the panel 54 and the receptacle 46. The receptacle actuator 46 is operable to move the panel 54 between the deployed position 56 and the release position 58. The receptacle actuator 60 may use any conventional actuating means such as, for example, a servomotor.

A guide assembly 62 is mounted in the housing 12 to guide the receptacle 46 to move horizontally below the plurality of containers 28. A drive system 68 is coupled to the guide assembly 62. The drive system 68 is operable to move the receptacle 46 with respect to the plurality of containers 28. The guide assembly 62 comprises a first track 64 and a second track 66. The receptacle 46 is slidably mounted to the first track 64, which extends between a front wall 16 and a rear wall 18 of the housing 12. The first track 64 is slidably mounted to the second track 66, which extends between a pair of lateral walls 20 of the housing 12. The drive system 68 comprises a first wheel 70, a first motor 72, a second wheel 74, and a second motor 76. The first wheel 70 is rotatably coupled to the receptacle 46 and engages the first track 64. The first wheel 70 is rotatable such that the receptacle 46 moves along the first track 64. The first motor 72 is operatively coupled to the first wheel 70 wherein the first wheel 70 is rotated by the first motor 72 when the first motor 72 is activated. The second wheel 74 is rotatably coupled to the first track 64 and engages the second track 66. The second wheel 74 is rotatable such that the receptacle 46 moves along the second track 66. The second motor 76 is operatively coupled to the second wheel 74 wherein the second wheel 74 is rotated by the second motor 76 when the second motor 76 is activated. Alternative drive means such as lead screws, linear actuators, or the like may move the receptacle 46 with respect to the first track 64 and move the first track 64 with respect to the second track 66. In some embodiments, the guide assembly 62 and the drive system 68 may define a robotic arm or other conventional conveying system.

The housing 12 has an overhang portion 22 which defines a dispensing area 78 below the overhang portion 22. The overhang portion 22 has a dispensing aperture 80 extending through a bottom wall 24 of the overhang portion 22, and the receptacle 46 is positionable over the dispensing aperture 80 to dispense the portion of the selected seasoning 32 through the dispensing portion and out of the housing 12. A funnel 82 is coupled to an exterior 26 of the housing 12 and is in fluid communication with the dispensing aperture 80. A channel 84 defined by the funnel 82 tapers from an upper end 86 of the funnel 82 to a lower end 88 of the channel 84. Seasoning 32 which is dispensed from the receptacle 46 through the funnel 82 is thus released in a stream to limit spills.

A processor 90 is operably coupled to each dispenser 36 of the plurality of dispensers 36, to the receptacle actuator 60, and to the drive system 68. The processor 90 is mounted in the housing 12, and a power supply 92 is electrically coupled to the processor 90. The power supply 92 comprises a battery 94. A power cord 96 is electrically coupled to the power supply 92 and is configured for electrically coupling to an external power source. An input 98 is operably coupled to the processor 90 and is actuatable to select multiple seasonings 32 of the plurality of seasonings 32 for dispensing through the dispensing aperture 80. The input 98 is mounted to the exterior 26 of the housing 12 and comprises a touchscreen 100. The input 98 also may comprise a keypad, voice command, or the like.

A sensor 102 is mounted in the receptacle 46 and is configured to measure the portion of the selected seasoning 32 when the portion of the selected seasoning 32 is contained in the receptacle 46. The sensor 102 is in signal communication with the processor 90 such that the processor 90 may operate based on signals received by the sensor 102. The sensor 102 may be coupled to the processor 90 via a wired or a wireless connection. The sensor 102 is coupled to the panel 54 and comprises a weight sensor 104 which determines a weight of the portion of the selected seasoning 32. The sensor 102 may also comprise a level sensor, a proximity sensor, or the like.

Each lid 106 of a plurality of lids 106 is positionable over an inlet 44 defined by an associated one of the plurality of containers 28 to selectively cover the inlet 44. Each lid 106 of the plurality of lids 106 is translucent such that the lid 106 is configured to permit viewing through the lid 106. Each one of a plurality of indicia 108 is coupled to an associated one of the plurality of lids 106 to indicate a type of the seasoning 32 positioned in the container 28 associated with the associated lid 106. The indicia 108 may be printed on labels which are interchangeably positioned on the plurality of lids 106, or the plurality of lids 106 may include a display medium such as a whiteboard, display screen, or the like for interchangeably displaying the indicia 108 to indicate the type of seasoning 32.

Each one of a plurality of desiccant holders 110 is mounted in an associated one of the plurality of containers 28. Each desiccant holder 110 of the plurality of desiccant holders 110 defines an interior space which has a size such that the desiccant holder 110 is configured for holding a desiccant packet. The desiccant packet is a bag or similar containing means which holds a desiccant for absorbing moisture, which can lead to mold growth, caking, or other undesirable results for the plurality of seasonings 32. A tray 112 is coupled to the housing 12 and is positioned below the dispensing aperture 80 of the housing 12. The tray 112 comprises a base 114 and a lip 116. The lip 116 is coupled to a periphery 118 of the base 114 and extends upwardly from the base 114. The lip 116 is configured for retaining a quantity of spilled seasoning 32 on the base 114 of the tray 112.

In use, the seasoning 32 dispensing apparatus 10 is operated to dispense multiple selected seasonings 32 from the plurality of seasonings 32 stored in the plurality of containers 28. The input 98 is actuated to select the multiple seasonings 32 which are dispensed by releasing given amounts of each of the selected seasonings 32 into the receptacle 46 and releasing the given amounts through the dispensing aperture 80 out of the housing 12. The multiple selected seasonings 32 may be collected in a vessel 120 placed under the dispensing aperture 80, where the multiple selected seasonings 32 may be mixed if desired. The sensor 102 is used to measure desired amounts of each of the selected seasonings 32. The desired amounts may be individually selected by a user via the input 98 or may be according to a preprogrammed recipe stored in a memory of the processor 90. In some embodiments, the user may program new recipes into the memory.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A seasoning dispensing apparatus comprising:
a housing;
a plurality of containers being coupled to a top wall of the housing, each container of the plurality of containers defining a compartment therein such that the container is configured for containing an associated one of a plurality of seasonings;
a plurality of dispensers, each dispenser being coupled to a bottom end of an associated one of the plurality of containers, each dispenser of the plurality of dispensers being operable to dispense the associated seasoning from the associated container;
a receptacle being movably mounted in the housing such that the receptacle is interchangeably positionable below each one of the plurality of containers, the receptacle defining a chamber therein such that the receptacle is configured for containing a portion of a selected one of the plurality of seasonings;
a panel being mounted to the receptacle and being movable between a deployed position and a release position, the receptacle preventing the portion of the selected seasoning from exiting the chamber when the panel is positioned in the deployed position, the panel permitting the portion of the selected seasoning to exit the chamber when the panel is positioned in the release position;
a receptacle actuator being coupled to the panel and the receptacle, the receptacle actuator being operable to move the panel between the deployed position and the release position;
a guide assembly being mounted in the housing which permits the receptacle to move horizontally below the plurality of containers;
a drive system being coupled to the guide assembly, the drive system being operable to move the receptacle with respect to the plurality of containers;
wherein the housing defines a dispensing aperture which extends into the housing, the receptacle being positionable to selectively dispense the portion of the selected seasoning through the dispensing aperture and out of the housing.

2. The apparatus of claim 1, wherein each dispenser of the plurality of dispensers comprises a gate and a dispenser actuator, the gate being movable by the dispenser actuator to open and close an outlet defined by the associated container.

3. The apparatus of claim 1, wherein:
the chamber of the receptacle has an upper opening and a lower opening extending therethrough to the chamber; and
the panel is positioned in the receptacle, the panel extending across the chamber when the panel is positioned in the deployed position.

4. The apparatus of claim 1, wherein the guide assembly comprises a first track and a second track, the receptacle being slidably mounted to the first track, the first track extending between a front wall and a rear wall of the housing, the first track being slidably mounted to the second track, the second track extending between a pair of lateral walls of the housing.

5. The apparatus of claim 4, wherein the drive system comprises:
a first wheel being rotatably coupled to the receptacle and engaging the first track, the first wheel being rotatable such that the receptacle moves along the first track;
a first motor being operatively coupled to the first wheel wherein the first wheel is rotated by the first motor when the first motor is activated;
a second wheel being rotatably coupled to the first track and engaging the second track, the second wheel being rotatable such that the receptacle moves along the second track; and
a second motor being operatively coupled to the second wheel wherein the second wheel is rotated by the second motor when the second motor is activated.

6. The apparatus of claim 1, wherein the housing has an overhang portion defining a dispensing area below the overhang portion, the overhang portion having the dispensing aperture extending through a bottom wall of the overhang portion, the receptacle being positionable over the dispensing aperture to dispense the portion of the selected seasoning through the dispensing portion and out of the housing.

7. The apparatus of claim 1, further comprising a funnel being coupled to an exterior of the housing and being in fluid communication with the dispensing aperture, a channel defined by the funnel tapering from an upper end of the funnel to a lower end of the channel.

8. The apparatus of claim 1, further comprising a processor being operably coupled to each dispenser of the plurality of dispensers, to the receptacle actuator, and to the drive system, the processor being mounted in the housing.

9. The apparatus of claim 8, further comprising a power supply being electrically coupled to the processor, the power supply comprising a battery.

10. The apparatus of claim 9, further comprising a power cord being electrically coupled to the power supply, the power cord being configured for electrically coupling to an external power source.

11. The apparatus or claim 8, further comprising an input being operably coupled to the processor, the input being actuatable to select multiple seasonings of the plurality of seasonings for dispensing through the dispensing aperture, the input being mounted to an exterior of the housing, the input comprising a touchscreen.

12. The apparatus of claim 8, further comprising a sensor being mounted in the receptacle, the sensor being configured to measure the portion of the selected seasoning when the portion of the selected seasoning is contained in the receptacle, the sensor being in signal communication with the processor.

13. The apparatus of claim 12, wherein the sensor is coupled to the panel, the sensor comprising a weight sensor.

14. The apparatus of claim 1, further comprising a plurality of lids, each lid of the plurality of lids being positionable over an inlet defined by an associated one of the plurality of containers to selectively cover the inlet.

15. The apparatus of claim 14, wherein each lid of the plurality of lids is translucent such that the lid is configured to permit viewing through the lid.

16. The apparatus of claim 15, further comprising a plurality of indicia, each indicia of the plurality of indicia being coupled to an associated one of the plurality of lids to indicate a type of the seasoning positioned in the container associated with the associated lid.

17. The apparatus of claim 1, further comprising a plurality of desiccant holders, each desiccant holder of the plurality of desiccant holders being mounted in an associated one of the plurality of containers, each desiccant holder of the plurality of desiccant holders defining an interior space which has a size such that the desiccant holder is configured for holding a desiccant packet.

18. The apparatus of claim 1, further comprising a tray being coupled to the housing and being positioned below the dispensing aperture of the housing, the tray comprising a base and a lip, the lip being coupled to a periphery of the base and extending upwardly from the base, the lip being configured for retaining a quantity of spilled seasoning on the base of the tray.

19. A seasoning dispensing apparatus comprising:
a housing;
a plurality of containers being coupled to a top wall of the housing, each container of the plurality of containers defining a compartment therein such that the container is configured for containing an associated one of a plurality of seasonings;
a plurality of dispensers, each dispenser being coupled to a bottom end of an associated one of the plurality of containers, each dispenser of the plurality of dispensers being operable to dispense the associated seasoning from the associated container, each dispenser of the plurality of dispensers comprising a gate and a dispenser actuator, the gate being movable by the dispenser actuator to open and close an outlet defined by the associated container;
a receptacle being movably mounted in the housing such that the receptacle is interchangeably positionable below each one of the plurality of containers, the receptacle defining a chamber therein such that the receptacle is configured for containing a portion of a selected one of the plurality of seasonings, the chamber having an upper opening and a lower opening extending therethrough to the chamber;
a panel being movably mounted in the receptacle between a deployed position and a release position, the panel extending across the chamber of the receptacle and prevents the portion of the selected seasoning from exiting the chamber through the lower opening when the panel is positioned in the deployed position, the panel permitting the portion of the selected seasoning to exit the chamber through the lower opening when the panel is positioned in the release position;
a receptacle actuator being coupled to the panel and the receptacle, the receptacle actuator being operable to move the panel between the deployed position and the release position;
a guide assembly being mounted in the housing, the guide assembly comprising a first track and a second track, the receptacle being slidably mounted to the first track, the first track extending between a front wall and a rear wall of the housing, the first track being slidably mounted to the second track, the second track extending between a pair of lateral walls of the housing, the guide assembly permitting the receptacle to move horizontally below the plurality of containers;
a drive system being coupled to the guide assembly, the drive system being operable to move the receptacle with respect to the plurality of containers, the drive system comprising:
a first wheel being rotatably coupled to the receptacle and engaging the first track, the first wheel being rotatable such that the receptacle moves along the first track;
a first motor being operatively coupled to the first wheel wherein the first wheel is rotated by the first motor when the first motor is activated;
a second wheel being rotatably coupled to the first track and engaging the second track, the second wheel being rotatable such that the receptacle moves along the second track; and
a second motor being operatively coupled to the second wheel wherein the second wheel is rotated by the second motor when the second motor is activated;
the housing having an overhang portion defining a dispensing area below the overhang portion, the overhang portion having a dispensing aperture extending through a bottom wall of the overhang portion, the receptacle being positionable over the dispensing aperture to dispense the portion of the selected seasoning through the dispensing portion and out of the housing;
a processor being operably coupled to each dispenser of the plurality of dispensers, to the receptacle actuator, and to the drive system, the processor being mounted in the housing;
a power supply being electrically coupled to the processor, the power supply comprising a battery;

a power cord being electrically coupled to the power supply, the power cord being configured for electrically coupling to an external power source;

an input being operably coupled to the processor, the input being actuatable to select multiple seasonings of the plurality of seasonings for dispensing through the dispensing aperture, the input being mounted to an exterior of the housing, the input comprising a touchscreen;

a sensor being mounted in the receptacle, the sensor being configured to measure the portion of the selected seasoning when the portion of the selected seasoning is contained in the receptacle, the sensor being in signal communication with the processor, the sensor being coupled to the panel, the sensor comprising a weight sensor;

a plurality of lids, each lid of the plurality of lids being positionable over an inlet defined by an associated one of the plurality of containers to selectively cover the inlet, each lid of the plurality of lids being translucent such that the lid is configured to permit viewing through the lid;

a plurality of indicia, each indicia of the plurality of indicia being coupled to an associated one of the plurality of lids to indicate a type of the seasoning positioned in the container associated with the associated lid;

a funnel being coupled to the exterior of the housing and being in fluid communication with the dispensing aperture, a channel defined by the funnel tapering from an upper end of the funnel to a lower end of the channel;

a plurality of desiccant holders, each desiccant holder of the plurality of desiccant holders being mounted in an associated one of the plurality of containers, each desiccant holder of the plurality of desiccant holders defining an interior space which has a size such that the desiccant holder is configured for holding a desiccant packet; and a tray being coupled to the housing and being positioned below the dispensing aperture of the housing, the tray comprising a base and a lip, the lip being coupled to a periphery of the base and extending upwardly from the base, the lip being configured for retaining a quantity of spilled seasoning on the base of the tray.

\* \* \* \* \*